United States Patent
Roitberg et al.

(10) Patent No.: US 10,854,969 B2
(45) Date of Patent: Dec. 1, 2020

(54) METHODS CIRCUITS DEVICES ASSEMBLIES AND SYSTEMS FOR PROVIDING AN ACTIVE ANTENNA

(71) Applicant: GETSAT COMMUNICATIONS LTD., Rehovot (IL)

(72) Inventors: Oleg Roitberg, Rehovot (IL); Kfir Benjamin, Rehovot (IL); Luca Marcaccioli, Perugia (IT); Simone Montori, Perugia (IT); Roberto Sorrentino, Perugia (IT)

(73) Assignee: GETSAT COMMUNICATIONS LTD., Rehovot (IL)

( * ) Notice: Subject to any disclaimer, the term of this patent is extended or adjusted under 35 U.S.C. 154(b) by 0 days.

(21) Appl. No.: 15/764,410

(22) PCT Filed: Sep. 29, 2017

(86) PCT No.: PCT/IB2017/056016
§ 371 (c)(1),
(2) Date: Mar. 29, 2018

(87) PCT Pub. No.: WO2018/060950
PCT Pub. Date: Apr. 5, 2018

(65) Prior Publication Data
US 2020/0091604 A1    Mar. 19, 2020

Related U.S. Application Data

(60) Provisional application No. 62/401,211, filed on Sep. 29, 2016.

(51) Int. Cl.
*H01Q 3/34* (2006.01)
*H04B 1/38* (2015.01)
*H01Q 21/08* (2006.01)

(52) U.S. Cl.
CPC .............. *H01Q 3/34* (2013.01); *H01Q 21/08* (2013.01); *H04B 1/38* (2013.01)

(58) Field of Classification Search
CPC .......... H01Q 3/34; H01Q 21/08; H01Q 21/06; H01Q 21/061; H04B 1/38
(Continued)

(56) References Cited

U.S. PATENT DOCUMENTS

| 8,988,300 B2 * | 3/2015 | Runyon | ................. | H01Q 13/02 343/776 |
| 2010/0259346 A1 * | 10/2010 | Runyon | ................. | H01Q 13/02 333/248 |

\* cited by examiner

*Primary Examiner* — Lee Nguyen

(57) ABSTRACT

Disclosed herein are methods, circuits, devices, assemblies and systems for facilitating wireless communication, both satellite and terrestrial. According to embodiments, there may be provided a integrated bidirectional phased array including multiple antenna element clusters, wherein each antenna cluster may be comprised of a set of antenna elements disposed in proximity to one another and connected to one another through an intra-cluster signal distribution line. Antenna element clusters may be connected to one another and to a main signal line through a network of inter-cluster signal distribution lines as least some of which may include electrically controllable signal phase shifters. A first set of antenna element clusters may be connected to a transmission signal (TX) line, thereby forming a TX antenna. A second set of antenna element clusters may be connected to a receive signal (RX) line, thereby forming a second RX antenna. Antenna elements of RX and TX antenna element clusters may disposed on a common surface, or parallel surfaces, in an interlaced manner.

20 Claims, 13 Drawing Sheets

(58) Field of Classification Search
USPC .......................................................... 455/73
See application file for complete search history.

METHODS CIRCUITS DEVICES ASSEMBLIES AND SYSTEMS FOR PROVIDING AN ACTIVE ANTENNA

FIELD OF THE INVENTION

The present invention generally relates to the field of wireless communication. More specifically, the present invention relates to methods, circuits, devices, assemblies and systems for facilitating wireless communication, both satellite and terrestrial.

BACKGROUND

An antenna (plural antennae or antennas), or aerial, is an electrical device which converts electric power into electromagnetic energy such as radio waves, and vice versa. It is usually used with a radio transmitter and/or a radio receiver to communicate information between points not connected by an electrical conductor. In transmission, a radio transmitter supplies an electric current oscillating at radio frequency (i.e. a high frequency alternating current (AC)) to the antenna's terminals, and the antenna radiates the energy from the current as electromagnetic waves (radio waves). In reception, an antenna intercepts some of the power of an electromagnetic wave in order to produce a tiny voltage at its terminals that is applied to an amplifier of a receiver.

Typically an antenna consists of an arrangement of metallic conductors (elements), electrically connected (often through a transmission line) to the receiver or transmitter. An oscillating current of electrons forced through the antenna by a transmitter will create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming radio wave exert force on the electrons in the antenna elements, causing them to move back and forth, creating oscillating currents in the antenna.

Antennas can be designed to transmit and receive radio waves in all horizontal directions equally (omnidirectional antennas), or preferentially in a particular direction (directional or high gain antennas). In the latter case, an antenna may also include additional elements or surfaces with no electrical connection to the transmitter or receiver, such as parasitic elements, parabolic reflectors or horns, which serve to direct the radio waves into a beam or other desired radiation pattern. FIG. 2A shows a set of directional antenna designs utilizing one or more RF reflectors in order to concentrate RF radiation arriving from a specific direction onto an opening of an RF receiver.

Antennas are essential components of all wireless communication equipment, receivers and transmitters, used as part of systems for radio broadcasting, broadcast television, two-way radio, communications receivers, radar, cell phones, and satellite communications, as well as other devices such as garage door openers, wireless microphones, Bluetooth-enabled devices, wireless computer networks, baby monitors, and RFID tags on merchandise.

Wi-Fi is a wireless local area network that enables portable computing devices to connect easily to the Internet. Standardized as IEEE 802.11 a,b,g,n, Wi-Fi approaches speeds of some types of wired Ethernet. Wi-Fi has become the de facto standard for access in private homes, within offices, and at public hotspots.

Cellular data service offers coverage within a range of 10-15 miles from the nearest cell site. Speeds have increased as technologies have evolved, from earlier technologies such as GSM, CDMA and GPRS, to 3G networks such as W-CDMA, EDGE, CDMA2000, UMTS, HSDPA, LTE, etc. Mobile Satellite Communications may be used where other wireless connections are unavailable, such as in largely rural areas or remote locations. FIG. 1A shows two ground stations communicating though a satellite relay. FIG. 1B shows a satellite acting as a signal relay between multiple terrestrial ground-stations geographically dispersed across the United States.

Satellite communications are especially important for transportation, aviation, maritime and military use. A very small aperture terminal (VSAT) is a two-way satellite ground station or a stabilized maritime VSAT antenna with an antenna that is smaller than 3 meters. The majority of VSAT antennas range from 75 cm to 1.2 m. Data rates range from 4 kbit/s up to 4 Mbit/s and higher. New modulation technologies are pushing the limits of uplink and downlink speeds. VSATs usually access satellites in geosynchronous orbits. VSATs can be used to transmit narrowband data (e.g., point-of-sale transactions using credit cards, polling or RFID data, or SCADA), or broadband data (for the provision of satellite Internet access to remote locations, VoIP or video). VSATs are also used for transportable, on-the-move or mobile maritime communications. The antenna designs from FIG. 2A may be used as VSATs.

FIG. 2B includes a set of antenna array designs, which antenna arrays may also provide either fixed or steerable directivity for both reception and transmission of RF. As evident from the designs, antenna arrays can be quite large, depending upon the number and relative placement of the antenna array elements. Typically, the larger the placement between antennas or antenna elements of an array the better directivity is achievable. There is, however, a need in the field of wireless communication for improved directivity with smaller form factors.

As demand for wireless communication systems having higher data rates at lower power consumption levels and using smaller form factors increases, there is likewise an increased need in the field of wireless communication for improved antennas and antenna assemblies with capacity to provide high TX and RX directivity.

SUMMARY OF INVENTION

The present invention includes methods, circuits, assemblies, devices, systems and associated computer executable code for wireless communication. More specifically, the present invention provides for an active electrically beam steerable radio frequency phased array antenna with interlaced transmitting and receiving antenna elements disposed substantially on a common plane or parallel planes. An RF radiating beam and an RF receiving beam may be electrically steered relative to a plane of the antenna array, without physically moving the antenna array, by adjusting phase shifters connected to groups of transmitting and receiving antenna, elements respectively. A group of antenna elements, transmitting or receiving, connected to the same phase shifter may be referred to as an antenna element cluster or sub-array.

According to embodiments, there may be provided an antenna array comprised of a set of individual antenna elements used for transmitting and/or for receiving electromagnetic signals, such as radio waves (RF). Antenna elements of an antenna according to embodiments may be electrically interconnected according to an arrangement or pattern which induces electrical current flow distribution through respective antenna elements according to an amplitude and/or phase relationship which causes the array of antenna elements to act as a single antenna with directional characteristics, such that the antenna has relatively higher transmission or reception gain in a specific direction than in other directions. An antenna element array according to embodiments may be arranged and/or configured to use electromagnetic wave interference to enhance a radiative signal in a desired direction at the expense of other directions. The antenna element array may also be configured to null a radiation pattern in one particular direction. A collective directionality of the antenna element array obtained through the arrangement may be greater than that provided by any individual antenna element, and thus a higher antenna signal gain may be provided, both for reception and transmission of RF signals.

According to embodiments, electrically controllable signal phase-shifting elements or devices (phase shifters) may provide for directive gain (beam) steering relative to a plane of the antenna, such that the specific direction in which the antenna provides a relatively higher transmission or reception gain is adjustable, electrically, without physically moving the antenna. Each of one or more phase shifters may be in the form of a discrete component adapted to be placed in series on a respective signal line (TX or RX) of the antenna and to introduce an electrically controllable signal phase-shift to a signal passing through the respective line.

One or more phase shifters according to embodiments of the present invention may be adapted to facilitate substantially continuous (non-discrete) adjustability to the introducible signal phase-shift. One or more phase shifting elements or devices may be adapted to facilitate substantially incremental (discrete steps) adjustability to the introduced signal phase-shift on a respective antenna signal line. An antenna according to further embodiments may include some combination of continues and incremental signal phase-shifting elements or components. A phase shifting element or device according to embodiments of the present invention may include: (a) an analog phase shifter, (b) a digital phase shifter, (c) a programmable phase shifter, (d) a mechanical phase shifter and/or (e) some combination of all of the above. A Rotman lens with multiple signal ports and connected to one or more signal switches can be used for signal phase shifting.

According to embodiments, there may be provided an antenna assembly including two or more separate antenna element arrays, for example, a first array of antenna elements for transmitting electromagnetic signals and another (e.g. second) array of antenna elements for receiving electromagnetic signals. According to some embodiments, some elements of either or both of the two or more separate antenna element arrays may be disposed across the same plane of the assembly, while other elements of either or both of the two or more separate antenna arrays may be disposed across different planes of the assembly. According to embodiments, some antenna array elements, such as signal distribution lines (for a TX Antenna Array) and/or signal aggregation lines (for an RX Antenna Array) may be disposed across the separate planes of the antenna assembly, TX signal distribution lines and RX aggregations lines may be shielded, for example to provide signal isolation between the lines, and isolation of the lines from external signal noise. An assembly of antenna elements forming an array of antenna elements and/or a combination of antenna element arrays may be referred to and treated as "an antenna" or as an "integrated composite antenna" (ICA). An ICA including electrically controllable phase shifters may be referred to as a "beam steerable integrated phase array" (IPA).

According to embodiments, there may be provided a beam steerable integrated phase array antenna (IPA) composed at least partially of a first array of transmitting antenna elements and a second array of receiving antenna elements. Each array may be segmented into one or more sub-arrays or one or more antenna element clusters. A sub-array or cluster of a given type may include antenna elements of only a given antenna element type, such as for example only radiating (TX) antenna elements, or only receiving (RX) antenna elements. An antenna element cluster or sub-array may be comprised of a set of antenna elements of a common type, placed in proximity to one another on the same plane, such as for example in a line.

Accordingly, an antenna element cluster of the first type may be referred to as a transmission (TX) antenna element cluster, a transmission type antenna element cluster, or an antenna element cluster of a transmission type. A transmission type antenna cluster according to embodiments may be electrically connected, directly or indirectly, to a transmission signal output line of an RF transmitter or an RF transceiver, and may thus form a (TX) antenna or a portion of a directional TX antenna array.

Accordingly, an antenna element cluster of the second type may be referred to as a receiving (RX) antenna element cluster, a receiving/receiver type antenna element cluster, or an antenna element cluster of a receiving type. A receiving type antenna cluster according to embodiments may be electrically connected, directly or indirectly, to a received signal input line of an RF receiver or an RF transceiver, and may thus form an (RX) antenna or a portion of a directional RX antenna array.

A set of antenna elements belonging to the same sub-array or cluster may be interconnected by a common intra-clusters signal line. Each antenna element cluster, of any cluster type, may include a dedicated intra-cluster signal line with multiple nodes, some nodes for connecting to antenna elements of the cluster and at least one node for electrically connecting, directly or indirectly, to an external signal line. If a given cluster includes TX or radiating antenna elements, the radiating or TX antenna elements within the given cluster may be said to be connected to one another through a common intra-cluster signal distribution line. If a given cluster includes RX or receiving antenna elements, the receiving or RX antenna elements within the given cluster may be said to be connected to one another through a common intra-cluster signal aggregation line.

According to some embodiments, a given antenna cluster (sub-array) of a given cluster type may include some number of antenna elements arranged linearly on a plane of the antenna array. According to further embodiments, the given cluster may be disposed next to another antenna element cluster, of a different cluster type, also arranged linearly one the substantially the same plane in parallel with the given cluster. Accordingly, each of a set of antenna element cluster or subarrays of a first type (e.g. TX antenna element cluster) may be disposed linearly and in between linearly disposed antenna clusters of a second type (e.g. TX antenna element cluster). This pattern of interlaced or interleaved linear antenna elements cluster or subarrays may be repeated to form integrated bidirectional antennas of varying sizes and antenna element densities.

According to embodiments of the present invention, radiating antenna elements of a TX cluster may be connected to a TX signal source through an intra-cluster signal distribution line including an electronically controllable phase shifter and an electronically controllable power amplifier. According to further embodiments, each TX cluster or subarray of a TX array may include a separate electronically controllable phase shifter and an electronically controllable power amplifier. Each intra-cluster signal distribution line's phase shifter and amplifier may be located at a node between the respective intra-cluster line and an inter-cluster signal distribution line which connects the signal source/transmitter to all of the intra-cluster distribution lines.

According to embodiments of the present invention, receiving antenna elements of a RX cluster may be connected to an RX signal sink through an intra-cluster signal aggregation line including an electronically controllable low noise amplifier and an electronically controllable phase shifter. According to further embodiments, each RX cluster or subarray of an RX array may include a separate electronically controllable phase shifter and an electronically controllable amplifier. Each intra-cluster signal aggregation line's phase shifter and amplifier may be located at a node between the respective intra-cluster line and an inter-cluster signal aggregation line which connects all of the intra-cluster aggregation lines to the signal sink/receiver.

A TX antenna array according to further embodiments may include two or more transmission type antenna element clusters, each with its own intra-cluster signal line, connected to one another through an electrical signal path including one or more inter-cluster signal lines. Intra-cluster signal lines of the TX antenna array may be referred to as intra-cluster signal distribution lines, while inter-cluster signal lines of the TX antenna array may be referred to as inter-cluster signal distribution lines. Thus, radiating antenna elements of the transmission antenna element cluster type may be connected to a transmission signal (TX) line of the IPA through a signal path including an intra-cluster signal distribution line, an electrically controllable phase shifter and an inter-cluster signal distribution line. According to further embodiments, the antenna elements, the intra-cluster signal lines and the inter-cluster signal lines may be part of a transmission (TX) path which also includes electronically controllable phase shifters and a power amplifier.

Receiver antenna elements of an antenna element cluster of the second type, according to embodiments, may be electrically interconnected to one another through an intra-cluster signal line, which intra-cluster signal line may be referred to as an intra-cluster signal aggregation line. Each antenna element cluster of receiving elements may include a dedicated intra-cluster signal aggregation line with multiple nodes, some for connecting to receiving antenna elements and one for electrically connecting, directly or indirectly, to a receive (RX) signal line. Accordingly, an antenna element cluster of the second type may be referred to as a receiver or receive (RX) antenna element cluster, a receiver type antenna element cluster, or an antenna element cluster of a receiving type. A receiving type antenna cluster according to embodiments may be electrically connected, directly or indirectly, to a receiver signal input line of an RF receiver or an RF transceiver, and may thus form an (RX) antenna or directional RX antenna array.

An RX antenna array according to further embodiments may include two or more receiving type antenna element clusters, each with its own intra-cluster signal line, connected to one another through an electrical signal path including one or more inter-cluster signal lines. Intra-cluster signal lines of the RX antenna array may be referred to as intra-cluster signal aggregation lines, while inter-cluster signal lines of the RX antenna array may be referred to as inter-cluster signal aggregation lines. Thus, receiving antenna elements of the receiver antenna element cluster may be connected to a receiver signal (RX) line of the IPA through a signal path including an intra-cluster signal aggregation line, an electrically controllable phase shifter, and an inter-cluster signal aggregation line. According to further embodiments, the antenna elements, the intra-cluster signal lines and the inter-cluster signal lines may all be located on different planes and selectively interconnected by transplaner electrical interconnect elements. According to yet further embodiments, the antenna elements, the intra-cluster signal lines and the inter-cluster signal lines may be part of a signal receive (RX) path which also includes electronically controllable phase shifters and a low noise amplifier.

According to embodiments, a first and second type of antenna element clusters may be disposed on either the same or on otherwise parallel planes of a PCB. All antenna element clusters of the first type may be formed and interconnected to each other, thereby forming a first antenna array on the PCB. Likewise, all antenna element clusters of the second type may be formed and interconnected to each other, thereby forming a second antenna array on the same PCB as the first array. One of the antenna arrays, for example the first antenna array, may be configured as a beam-forming RF transmission antenna array. While the other antenna array disposed on the same PCB, for example the second antenna array, may be configured as a beam-forming RF receiver/receiving antenna array.

According to embodiments, TX antenna clusters may be comprised of relatively smaller antenna elements than are RX antenna clusters. Each antenna element, TX or RX, may be composed of a circular electrically conductive patch. According to further embodiments, one or more of the antenna elements, TX or RX, may be functionally associated with an RF focusing element, which RF focusing element. According to some embodiments, the RF focusing element may be made of electrically conductive material, ring shaped and disposed concentrically and parallel with its associated antenna element at some elevation above the associated antenna element. According to further embodiments, the ring shaped RF focusing element may include radially pointing studs or spoke like features.

According to embodiments, each intra-cluster signal line for each of the antenna element cluster may be disposed on a PCB oriented on different plane from the antenna element PCB. Trans-planer interconnect elements may be used to connect points on a signal distribution line to a respective antenna element. According to further embodiments, a transplaner interconnect element may include or be otherwise functionally associated with a signal polarizer, for example a circular polarizer.

Phase-shifters and amplifiers relating to each the intra-cluster signal lines may be disposed on the same or a functionally associated PCB as the respective intra-cluster signal line. Collectively, the two antenna element arrays disposed on the same PCB may, along with associated signal lines, phase shifters and amplifiers, disposed on the same or functionally associated PCB's, may form a full duplex bi-directional beam-forming RF antenna usable with RF transmitters, receivers and/or transceivers including those used in conjunction with terrestrial and satellite communication systems. According to some embodiments, one of the antenna arrays may be connected to a transmission line of an RF transmitter or transceiver, while the second antenna array may be connected to a receive line of an RF receiver or transceiver.

According to some embodiments, there may be signal isolation elements placed in between parallel intra-cluster signal line PCB's. According to further embodiments, PCB trenches may be place or dug around antenna element patches on the PCB. According to yet further embodiments, filler material, for example RF transparent Teflon, may be placed between adjacent elements and in between antenna elements and respective RF focusing element.

A controller according to embodiments, integral or otherwise associated with the antenna, may electronically adjust each of the phase shifters and each of the power amplifiers for each of the TX clusters to generate and steer a TX beam in an intender direction, for example, towards a satellite or terrestrial base station. The same or a functionally associated controller may electronically adjust each of the phase shifters and each of the power amplifiers for each of the RX clusters to generate and steer an RX beam in an intender direction, for example, towards the same or another satellite or terrestrial base station.

According to some embodiments, the antenna cluster lines may be arranged horizontally and the beam steering may be vertical beam steering. According to further embodiments, the antenna may be mounted on an electromechanical electromechanical turret or similar aiming platform, which may be controller by the same or another beam targeting controller.

According to some embodiments, there may be provided a beam targeting system for directing in a synchronized manner one or more beamforming networks on the antenna and for control circuit of the electromechanical turret. The targeting system may be adapted to target and/or track a direction of a satellite or terrestrial wireless access point (e.g. base-station) and to direct either RF and/or TX beams towards the targeted satellite or terrestrial wireless access point. The antenna, turret, turret control system and functionally associated transceiver may be carried on a person and/or on a moving platform such as a vehicle, vessel or aircraft.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
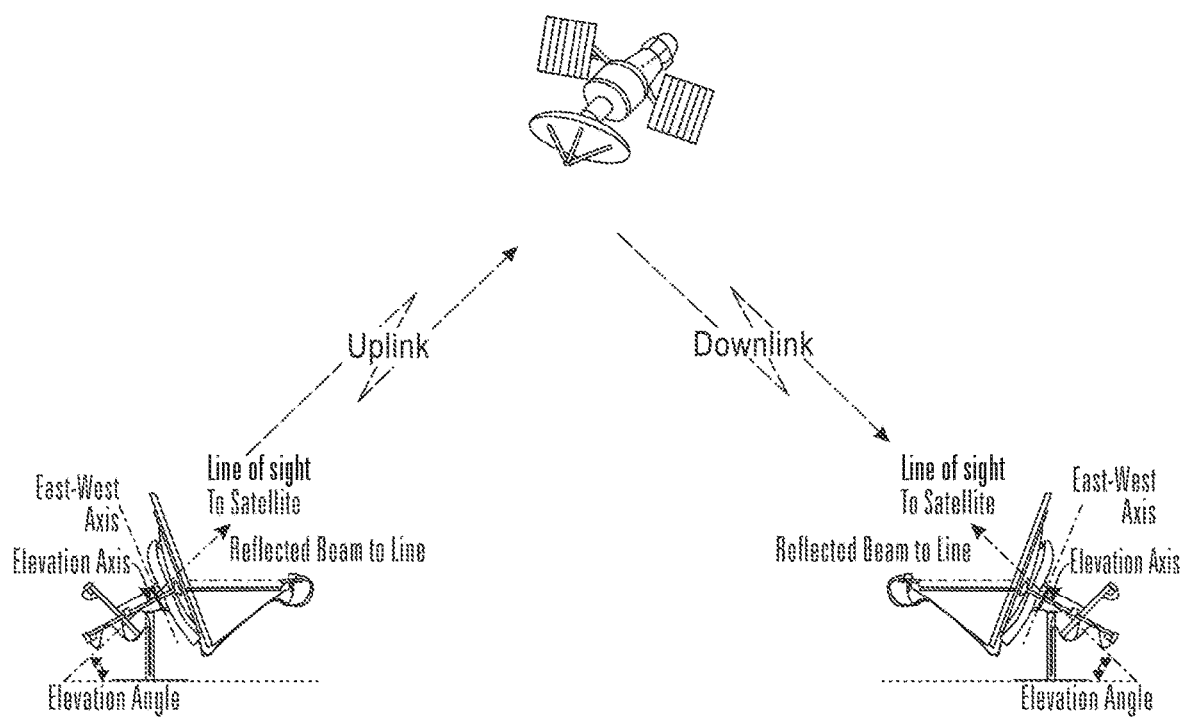
FIG. 1A illustrates a point to point wireless communication link between two communication nodes facilitated by a satellite acting as a signal relay.
Figure 1B:
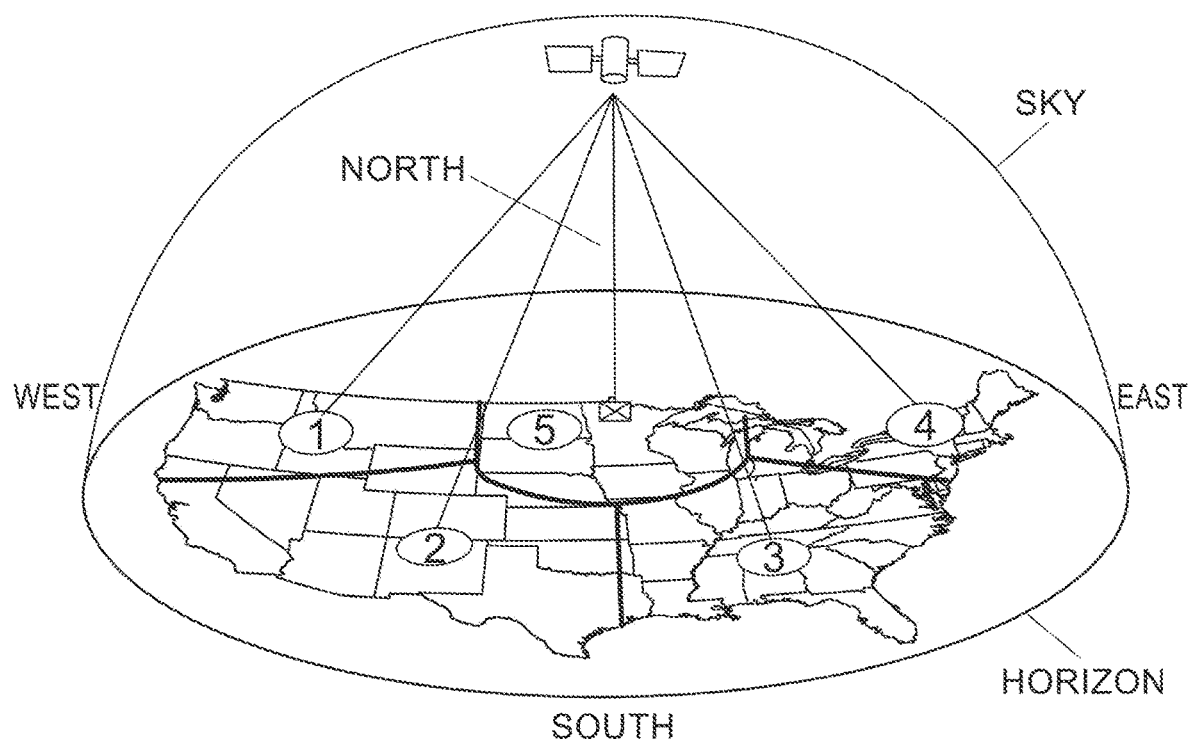
FIG. 1B illustrates a satellite communication system or network including a single satellite providing wireless connectivity and date relay service between a set of terrestrial communication nodes spread across the United States.
Figure 2A:
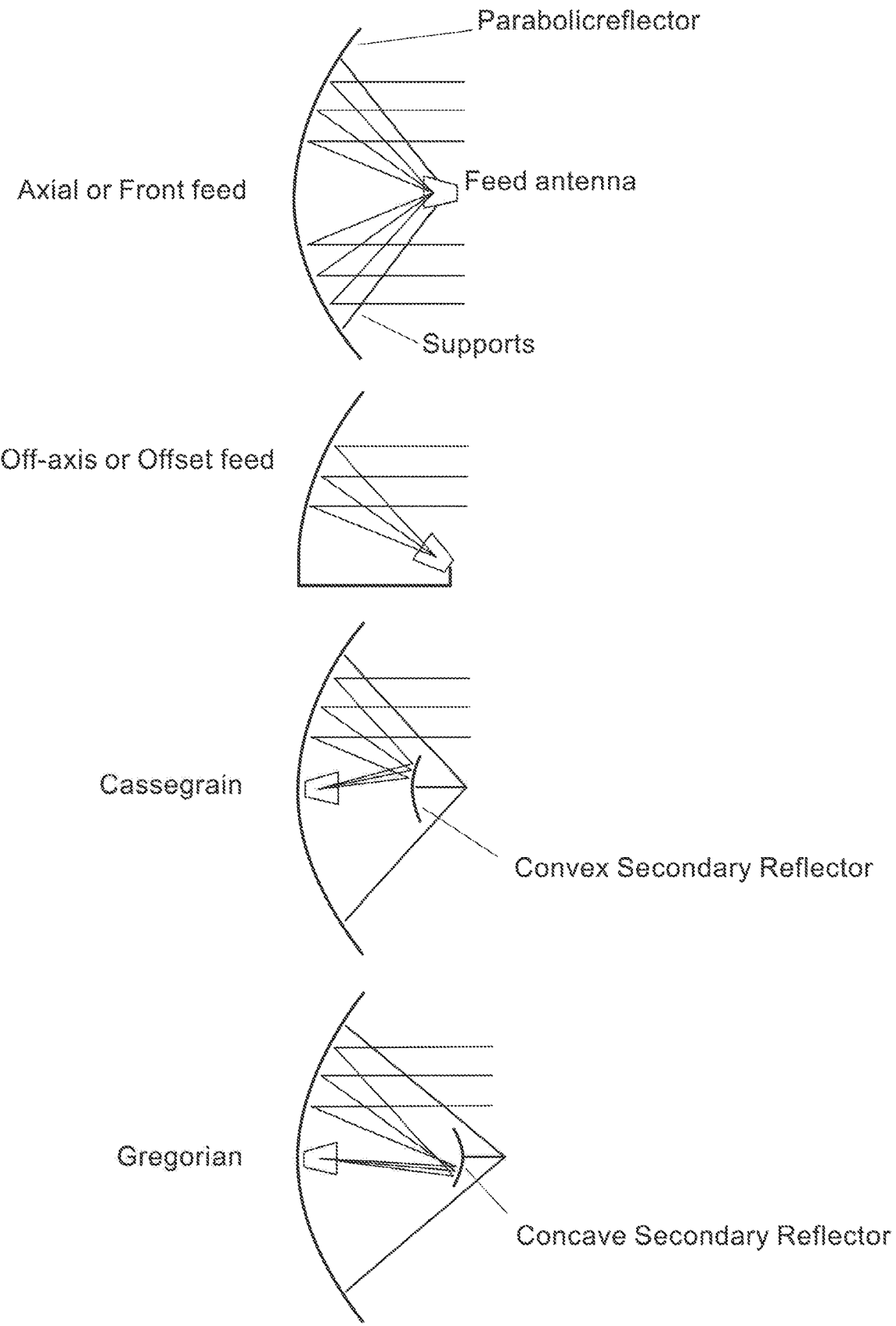
FIG. 2A includes illustrations of a set of antenna designs using signal reflectors to provide directional antennas usable in conjunction with wireless RF communication systems.
Figure 2B:
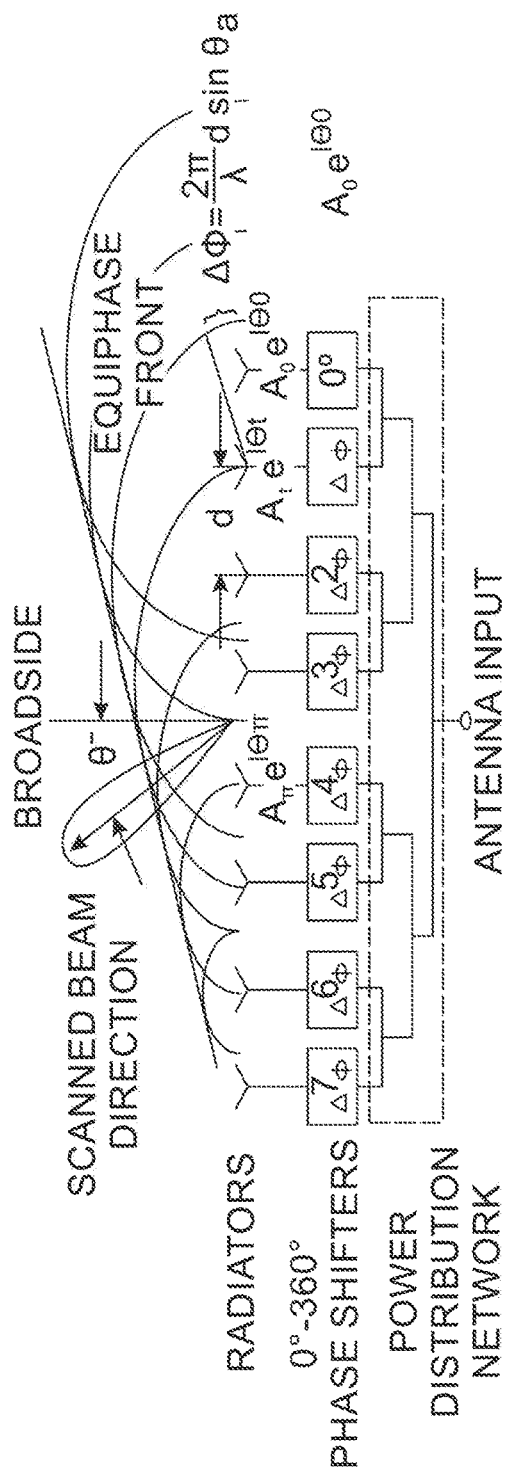
FIG. 2B includes illustrations of a set of antenna designs for antenna arrays (e.g. phased arrays) usable in conjunction with wireless RF communication systems.
Figure 2B:
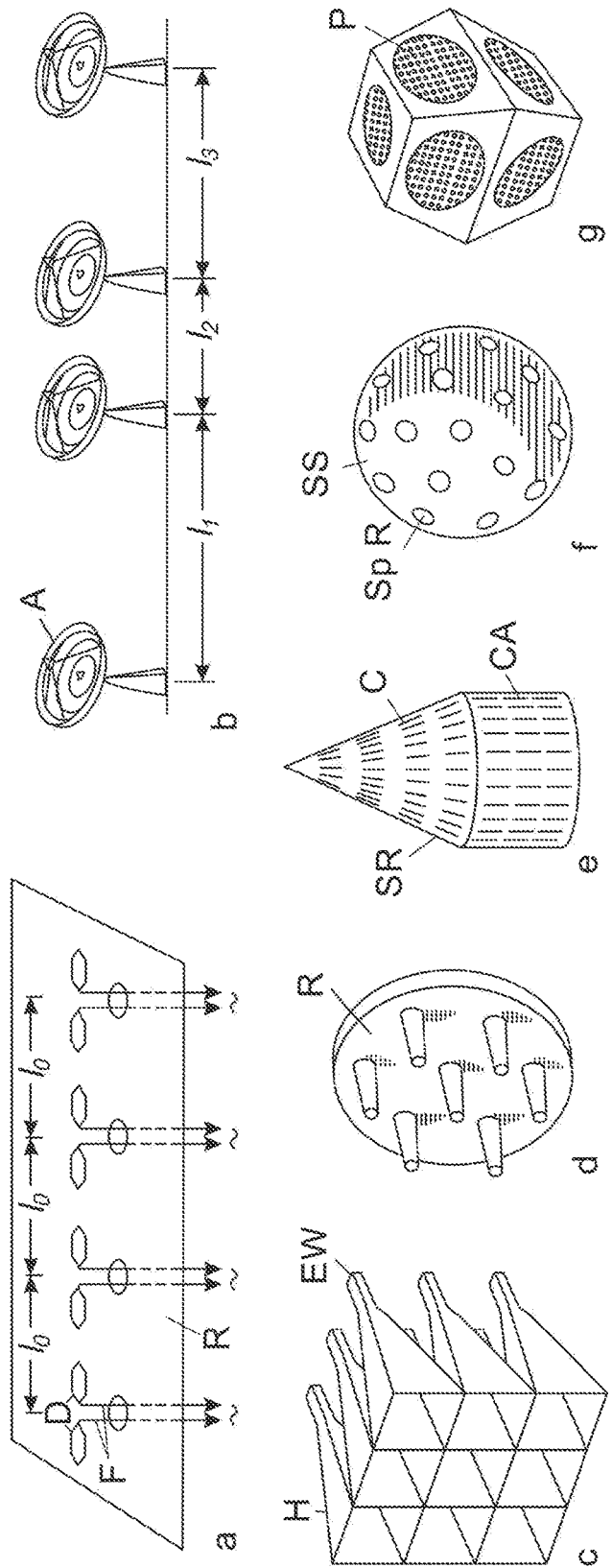

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE FIGURES

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like. Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), any composition and/or architecture of semiconductor based Non-Volatile Memory (NVM), any composition and/or architecture of biologically based Non-Volatile Memory (NVM), a rigid magnetic disk, and an optical disk. Some demonstrative examples of optical disks include compact disk—read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other functionally suitable components may be used.

According to embodiments, there may be provided an active integrated composite antenna including a first antenna element array with two or more antenna element subarrays/clusters of a first type and disposed on a first plane, wherein each cluster may be comprised of two or more radiating antenna elements electrically connected to one another with an intra-cluster signal line and the two or more antenna element clusters of the first type are electrically connected to one another through an inter-cluster signal line. The active antenna may include a transmission (TX) signal line disposed on a second plane and electrically connected to the inter-cluster signal line through a controllable signal phase sifter, optionally passing through a ground plane. The antenna may include a second antenna element array comprising at least one antenna element cluster of a second type including receiving antenna elements disposed in an interlaced manner with radiating antenna elements of at least one of said antenna element clusters of the first type. The intra-cluster signal line may be a signal distribution line disposed on a plane other than the first plane and connected to each of two or more antenna elements with a trans-planer interconnect, optionally with a circular polarizer. The antenna may include an intra-cluster signal aggregation line electrically connecting two or more receiving antenna elements of the antenna element cluster of the second type to one another. The intra-cluster signal aggregation line may be disposed on a plane different from a plane upon which said receiving antenna elements are disposed and may be connected to respective receiving antenna elements through a trans-planer interconnect, optionally with circular polarizers. The intra-cluster signal aggregation line may electrically connect receiving antenna elements of a cluster of the second type to a Receive (RX) signal line through a signal path which includes a controllable signal phase shifter. Two or more receiving antenna elements of two or more clusters of the second type may be electrically connected to one another and to the RX signal line through an inter-cluster signal aggregation line residing on a plane other than the antenna element or intra-cluster planes. One or more of the antenna element clusters of the first type may include: (a) two or more antenna elements configured for operation in the KA/K band; and (b) polarizers. The polarizers may be integrated and may provide for circular polarization (LHCP/RHCP) on the antenna element clusters of the first type. One or more of the antenna element clusters of the second type may include: (a) two or more antenna elements configured for operation in the KA/K band; and (b) polarizers. The polarizers may be integrated and may provide for circular polarization (LHCP/RHCP) on the antenna element clusters of the second type.

According to embodiments, there may be provided a wireless communication system comprising a wireless transceiver and a composite antenna structure including at least one antenna element cluster of a first type having a set of radiating antenna elements disposed on a first plane and interconnected by an intra-cluster signal distribution line. The antenna structure may include at least one antenna element cluster of a second type including a set of receiving antenna elements interconnected by an intra-cluster signal aggregation line and disposed, either on the first plane or on a plane parallel to the first plane, in an interlaced manner with the radiating antenna elements.

The composite antenna structure may include an inter-cluster signal distribution line interconnecting two or more antenna element clusters of said first type. The radiating antennal elements and the intra-cluster signal distributions lines may be disposed on different planes and electrically interconnected through one or more trans-planer interconnects. The intra-cluster signal distribution lines and the inter-cluster signal distribution lines may each be disposed on a different plane and interconnected through one or more trans-planer interconnects. The intra-cluster signal distribution lines may be composed of a strip-line and the inter-cluster signal distribution lines may be formed by a cavity waveguide. A transmission signal line of the composite antenna structure may be connectable or connected to an output of the RF transceiver.

The active antenna structure according to embodiments may further include an inter-cluster signal aggregation line interconnecting two or more antenna element clusters of said second type. The receiving antennal elements and the intra-cluster signal aggregation lines may be disposed on different planes and electrically interconnected through one or more trans-planer interconnects. The intra-cluster signal aggregation lines and the inter-cluster signal aggregation lines may each be disposed on a different plane and interconnected through one or more trans-planer interconnects. The intra-cluster signal aggregation lines may be composed of a strip-line and the inter-cluster signal aggregation lines may be formed by a cavity waveguide. A receive signal line of the antenna structure may be connected to an input of the RF transceiver.

According to embodiments, there may be provided an active beam steerable integrated phase array antenna including a first antenna element array comprising two or more antenna element clusters of a first cluster type and disposed on a first plane, wherein each cluster of the first cluster type is comprised of two or more radiating antenna elements electrically connected to one another with an intra-cluster signal distribution line, wherein said intra-cluster signal distribution line is connected to a signal source through an electrically controllable signal phase-shifter. A second antenna element array comprising at least one antenna element cluster of a second cluster type including two or more receiving antenna elements interconnected with an intra-cluster signal aggregation line and disposed between radiating antenna elements of said two or more clusters of the first cluster type, wherein said intra-cluster signal aggregation line is connected to signal drain through an electrically controllable signal phase-shifter.

The intra-cluster signal distribution line may be substantially linear in one plane and may be branching to form a signal distribution network in a second plane. The signal distribution line may be disposed on a plane other than the first plane, and may be connected to each of two or more antenna elements through a circular polarizer. The radiating antenna elements may be circular in shape and an antenna element cluster of the first type may be arranged in a line.

The intra-cluster signal aggregation line may be substantially linear in one plane and may be branching to form a signal aggregation network in a second plane. The signal aggregation line may be disposed on a plane different from a the plane upon which said receiving antenna elements are disposed, and may be connected to respective receiving antenna elements through a polarizer. The receiving antenna elements may be circular in shape and an antenna element cluster of the second type may be disposed in a line, optionally parallel to the radiating antenna element line.

Antenna clusters of the first type and antenna clusters of the second type may each be linearly arranged and disposed side by side with one another in an alternating order on the same or on parallel planes.

The active antenna may include a transmission (TX) chain with a signal input port to receive a TX signal from a signal source, an inter-cluster signal distribution line to distribute the TX signal to each of a set of radiating antenna element clusters, an electrically controllable signal phase-shifter and a power amplifier between said inter-cluster signal distribution line and a respective intra-cluster signal distribution line of each of the radiating antenna element clusters. The power amplifier associated with each signal line may receive feedback from a signal power monitor on the same line.

The active antenna signal receive (RX) chain may include a signal output port to provide an RX signal to a signal drain, an inter-cluster signal aggregation line to aggregate RX signals from each of a set of receiving antenna element clusters, an electrically controllable signal phase-shifter and a low-noise amplifier between said inter-cluster signal aggregation line and a respective intra-cluster signal aggregation line of each of the receiving antenna element clusters.

The active antenna may include a beamforming and/or a beam-steering controller configured to generate control signals for at least one of the phase-shifters on said TX chain. The same or another beam-steering controller may be configured to generate control signals for at least one of the phase-shifters on said RX chain. The same or another beam-steering controller may be configured to generate control signals for at least one of the phase-shifters on either the TX or RX chains and to generate a control signal for an electro-mechanical positioning actuator or motor of a platform on which active antenna is physically supported.

According to embodiments, at least one radiating antenna element and or at least one receiving antenna element may be associated with a radio frequency focusing element disposed some distance above a radiating surface of said antenna element. The antenna element, radiating or receiving, may be circular and the radio frequency focusing element is ring shaped. One or more of the antenna element clusters of the first type may include: (a) two or more antenna elements configured for operation in the KA/K band; and (b) polarizers. The polarizers may be integrated and provide for circular polarization (LHCP/RHCP).

One or more of the antenna element clusters of the second type include: (a) two or more antenna elements configured for operation in the KA/K band; and (b) polarizers. The polarizers are integrated and provide for circular polarization (LHCP/RHCP).

Figure 3:
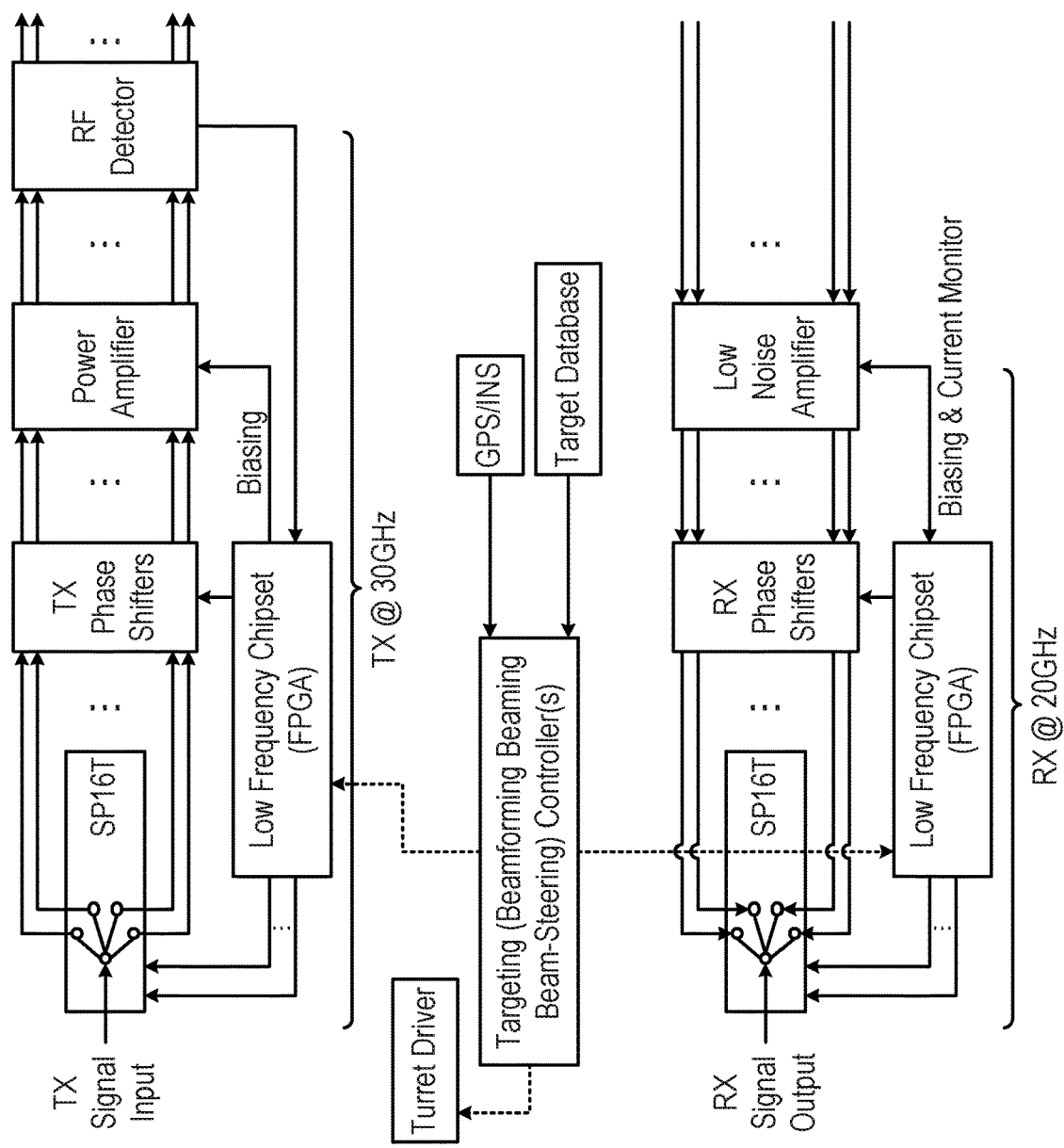
FIG. 3 shows a functional block diagram of a beam steerable, full duplex, bidirectional active antenna, including an electrically controllable TX beaming forming network and an electrically controllable RX beamforming network, according to embodiments of the present invention.

Turning now to FIG. 3, there is shown a functional block diagram of a beam steerable, full duplex, bidirectional active antenna, including an electrically controllable TX beaming forming network and an electrically controllable RX beamforming network, according to embodiments of the present invention. The TX signal chain includes a signal splitter, to split a TX signal across multiple signal distribution lines, each associated with a separate TX antenna element cluster or subarray. A TX phase shifter block includes a separate individually controllable signal phase shifter for each different cluster or subarray. Also shown is a power amplifier block with a separate power amplifier for each TX cluster or subarray. A signal power monitor block includes signal monitoring for each subarray line and provides feedback to an FPGA or other control circuits for regulating in a synchronized manner the phase shifter and amplifier according to instructions from a higher lever (targeting) controller. The RX signal chain includes a signal splitter, to aggregate RX signals received from multiple signal aggregation lines, each associated with a separate RX antenna element cluster or subarray. A RX phase shifter block includes a separate individually controllable signal phase shifter for each different cluster or subarray. Also shown is a low noise amplifier block, upstream from the RX phase shifter, with a separate power amplifier for each RX cluster or subarray.

Both the TX signal chains and the RX signal chains are controlled by multiple layers of control circuits directed by a targeting controller. The targeting controller adjusts phasing on the TX and RX chains to achieve beam direction corresponding to target communication nodes. The controller also controls an electromechanical platform to achieve an intended direction. Absolute relative target direction is calculated by comparing the active antenna's current location, as provided by GPS/INS circuits and an absolute location of a target node, as recoded in a target database.

Figure 4A:
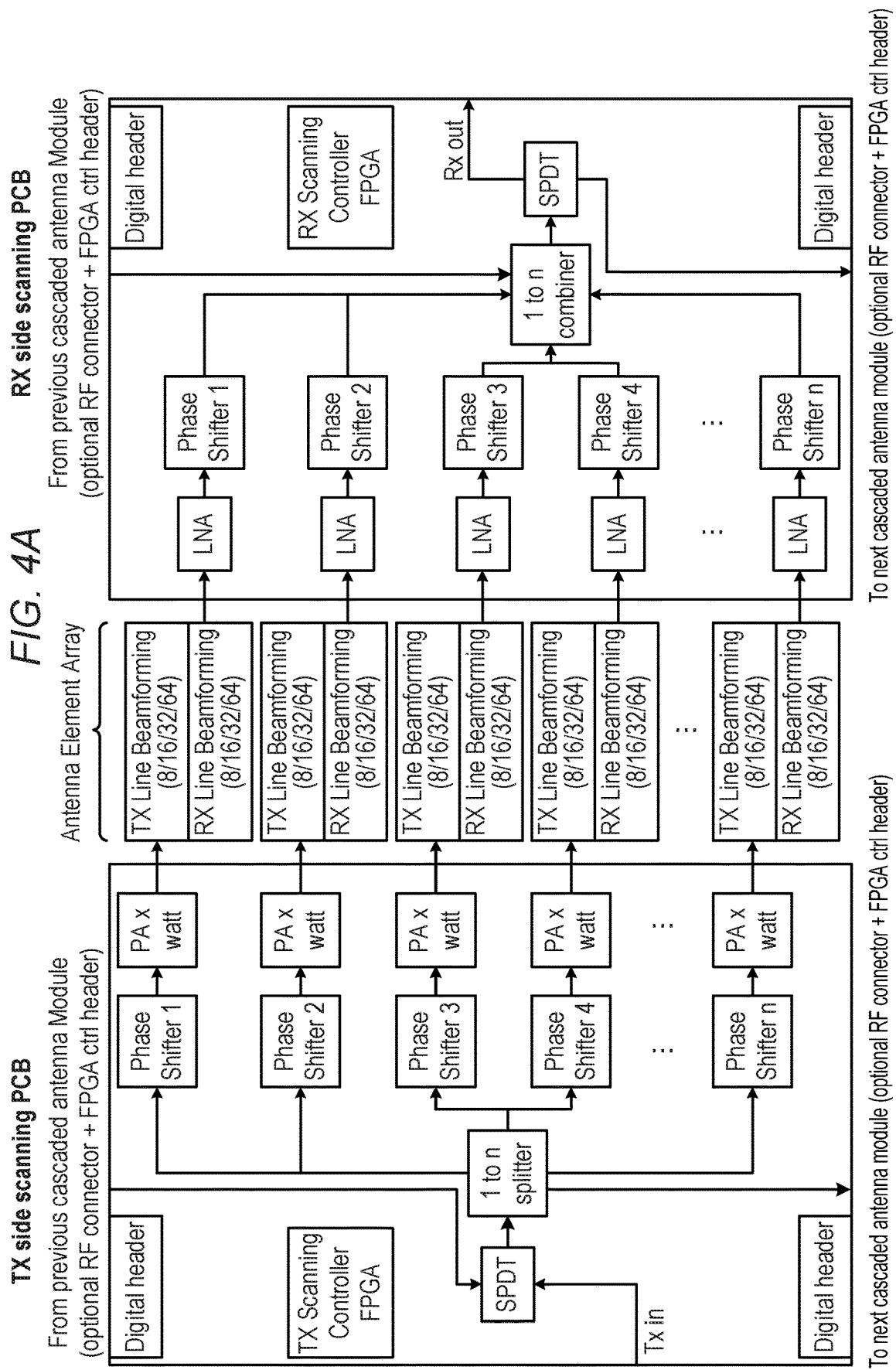
FIG. 4A shows a signal path diagram of an electrically controllable TX beaming forming network of the active antenna interconnected with TX antenna subarrays (antenna element clusters) and an electrically controllable RX beamforming network of the active antenna interconnected with RX antenna subarrays, in accordance with embodiments of the present invention.
Figure 4B:
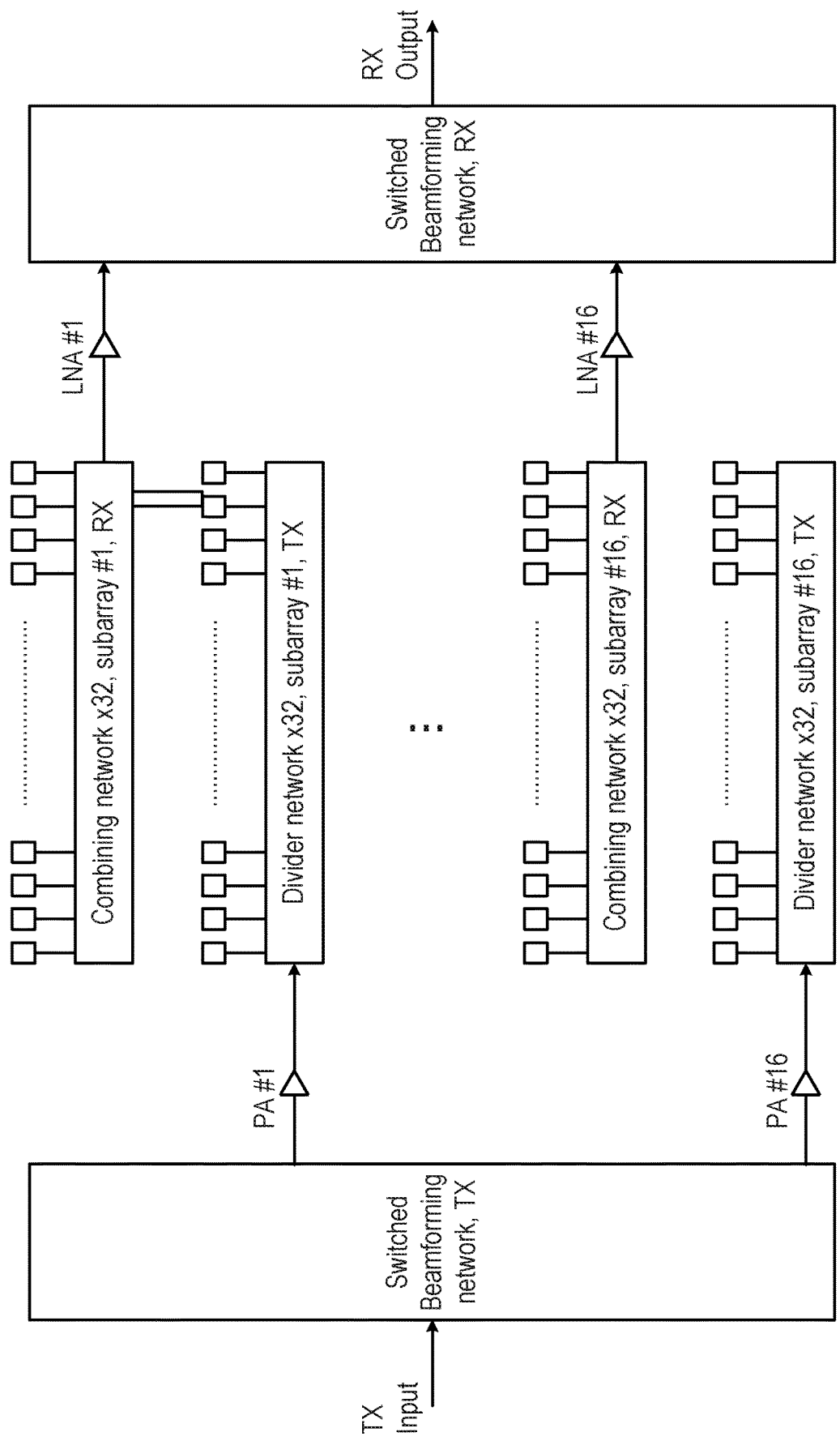
FIG. 4B shows another format of the signal path diagram for the electrically controllable TX and RX beaming forming networks interconnected to respective TX and RX subarrays and further showing individual TX and RX antenna elements for each subarray interlaced with one another.

FIG. 4A shows a signal path diagram of an electrically controllable TX beaming forming network of the active antenna interconnected with TX antenna subarrays (antenna element clusters) and an electrically controllable RX beam-forming network of the active antenna interconnected with RX antenna subarrays, in accordance with embodiments of the present invention. FIG. 4B shows another format of the signal path diagram for the electrically controllable TX and RX beaming forming networks interconnected to respective TX and RX subarrays and further showing individual TX and RX antenna elements for each subarray, wherein the antenna elements of different clusters are shown to be aligned in parallel with each other and at least partially interlaced, in accordance with certain exemplary embodiments of the present invention.

Figure 4C:
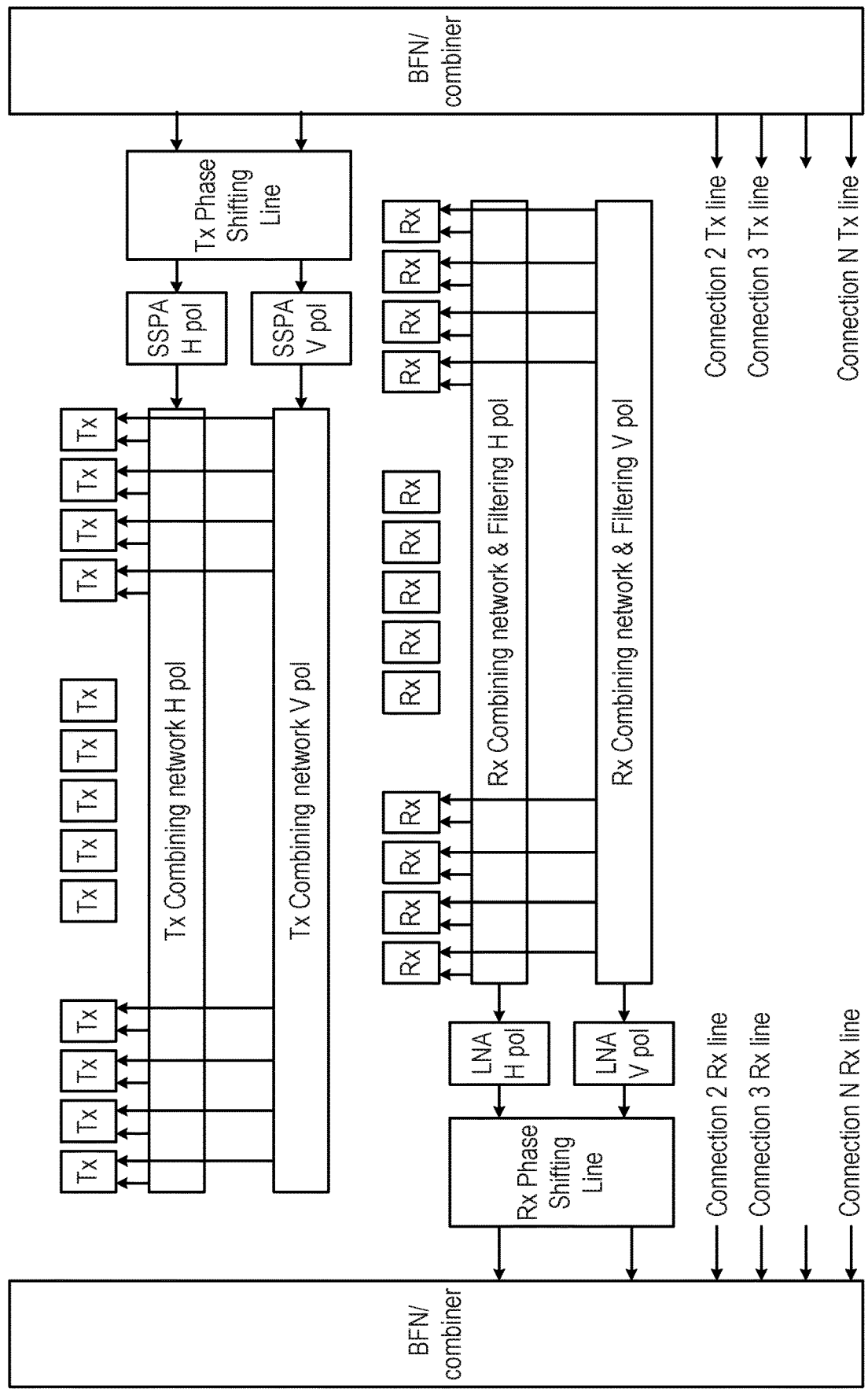
FIG. 4C shows a format of the signal path diagram for the electrically controllable TX and RX beaming forming networks interconnected to respective TX and RX subarrays, and individual subarrays connected to respective antenna elements, TX and RX, through respective polarizers, V pol and H Pol, in accordance with embodiments of the present invention.

Turning now to FIG. 4C, there is shown a format of the signal path diagram for the electrically controllable TX and RX beaming forming networks interconnected to respective TX and RX subarrays, and individual subarray signal lines connect to respective antenna elements, TX and RX, through respective polarizers, V pol and H Pol, in accordance with embodiments of the present invention.

Figure 5A:
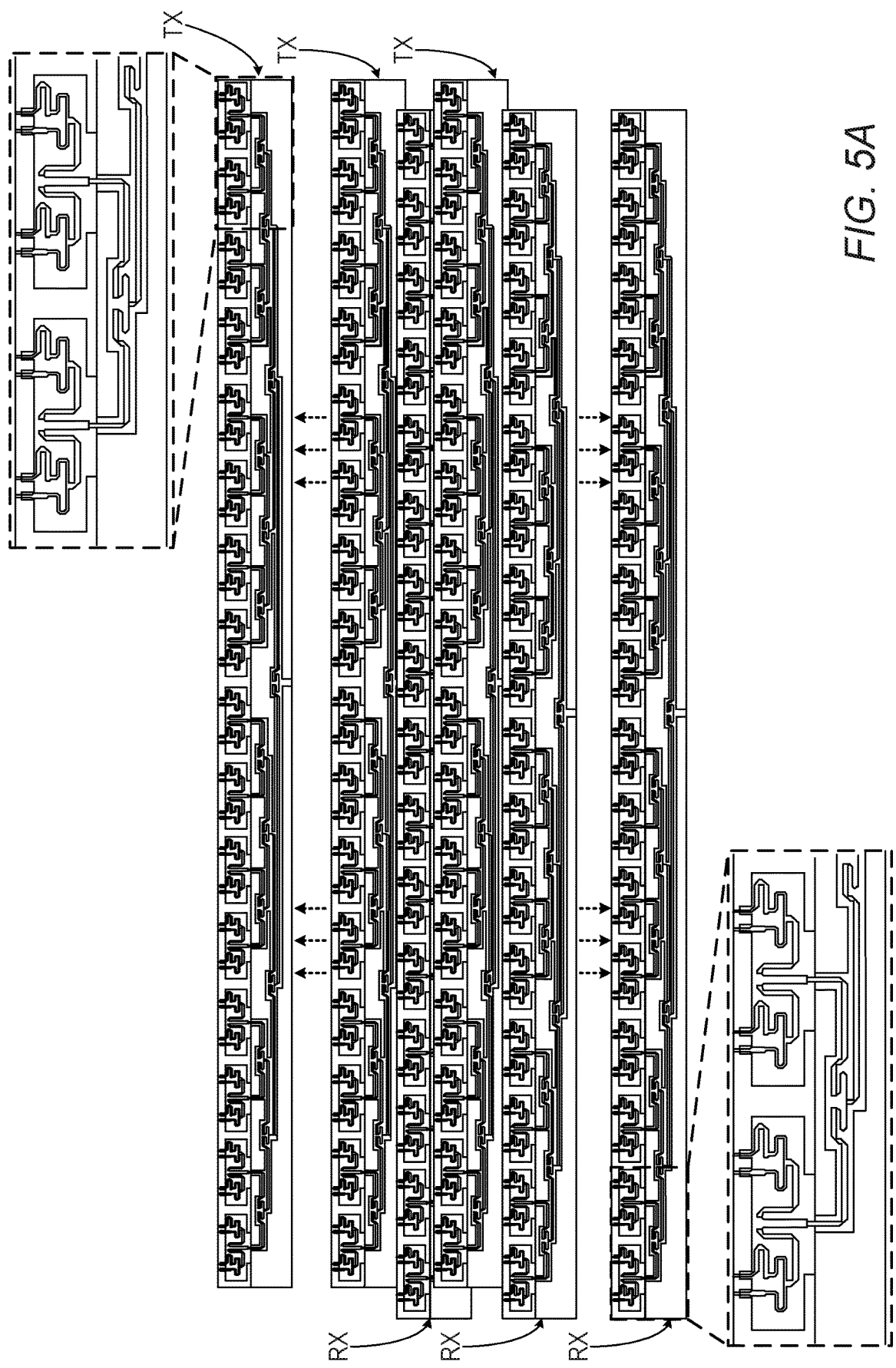
FIG. 5A shows side views of exemplary intra-cluster signal lines, distribution lines and aggregation line, as strip line waveguides on respective PCB's.

FIG. 5A shows side views of exemplary intra-cluster signal lines, distribution lines and aggregation line, in the form of strip line waveguides on respective PCB's. The strip lines for each PCB associated with each subarray or cluster, RX and TX, is linear in one plane and branching in another plane. The branched routing of the strip lines is configured to provide an equidistant signal path between a signal input or signal output node of the waveguide and respective antenna element interconnect points of the waveguide. Zoom in of both the TX and RX waveguide PCB's also shows a circular polarizer network at the interconnect point to each antenna element, RX and TX.

Figure 5B:
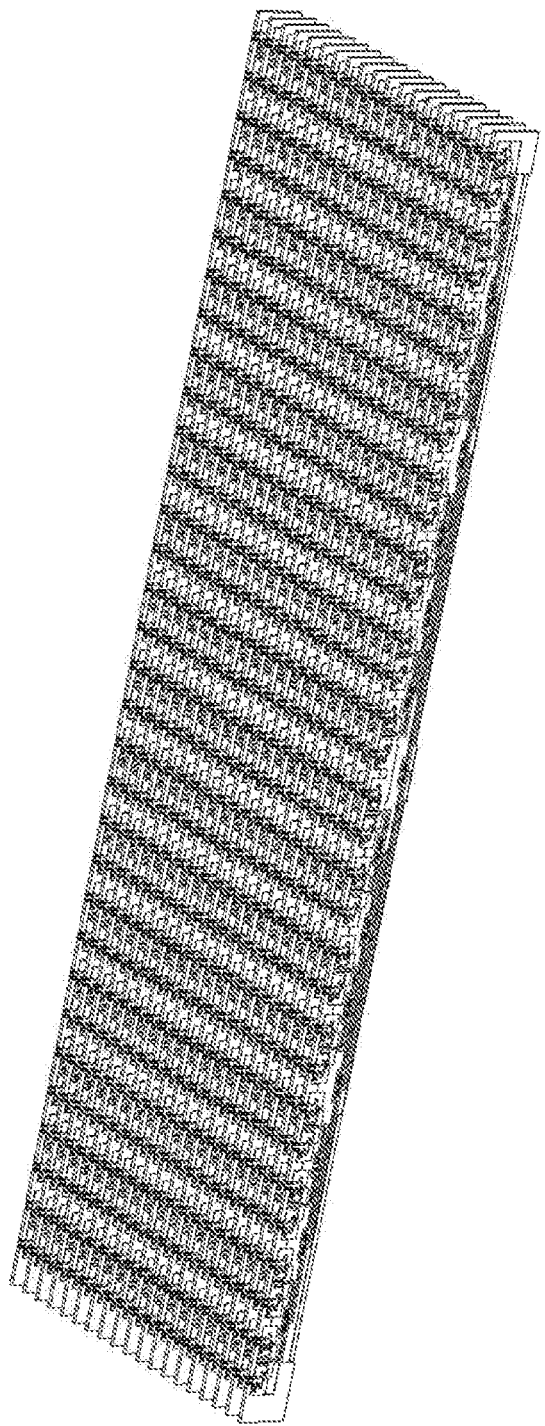
FIG. 5B shows a prospective view of the PCB's in FIG. 5A aligned side by side within an exemplary metallic antenna housing and separated by respective metallic signal isolation structures.
Figure 5C:
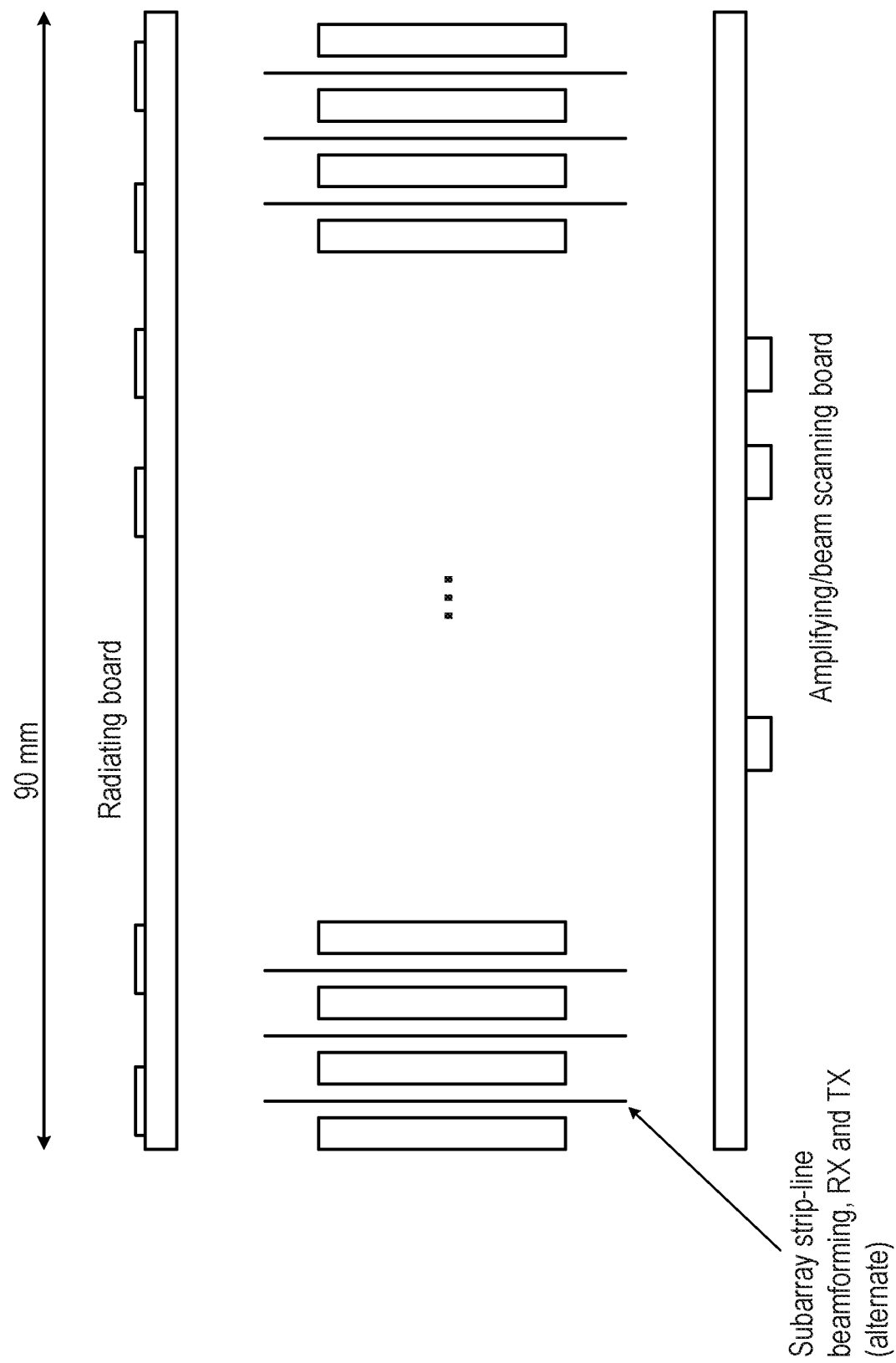
FIG. 5C shows a cross-sectional from the narrow side of the metallic housing in FIG. 5B, and illustrating exemplary placement of the strip line waveguide PCB relative an antenna element PCB on top and an amplifier beamforming network board below.

Turning now to FIG. 5B, there is shown a prospective view of the PCB's in FIG. 5A aligned side by side within an exemplary metallic antenna housing and separated by respective metallic signal isolation structures. FIG. 5C shows a cross-sectional from the narrow side of the metallic housing in FIG. 5B, and illustrating exemplary placement of the strip line waveguide PCB relative an antenna element PCB on top and an amplifier beamforming network board below.

Figure 6B:
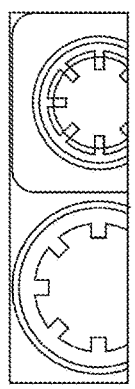
FIG. 6B is a top view, with filler material transparent, of the exemplary TX and RX antenna elements disposed side by side on the PCB portion with respective RF focusing elements above each, according to embodiments of the present invention.
Figure 6A:
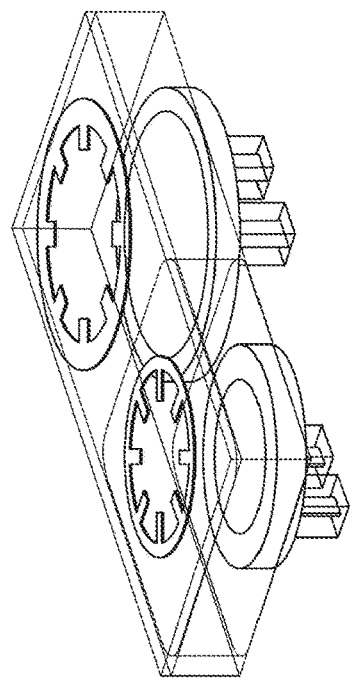
FIG. 6A shows a prospective view, with filler material transparent, of exemplary TX and RX antenna elements disposed side by side on a PCB portion with respective RF focusing elements above each, according to embodiments of the present invention.
Figure 6C:
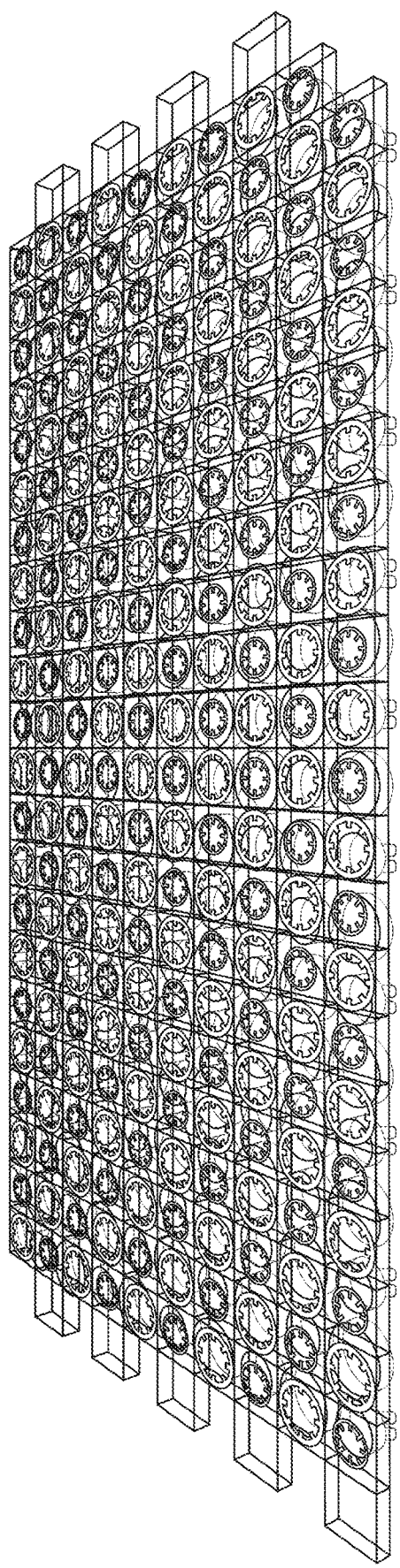
FIG. 6C is a prospective view, with filler material transparent, of an antenna element array surface according to embodiments of the present invention.

FIG. 6A shows a prospective view, with filler material transparent, of exemplary TX and RX antenna elements disposed side by side on a PCB portion with respective RF focusing elements above each, according to embodiments of the present invention. FIG. 6B shows a top view, with filler material transparent, of the exemplary TX and RX antenna elements disposed side by side on the PCB portion with respective RF focusing elements above each, according to embodiments of the present invention. FIG. 6C is a prospective view, with filler material transparent, of an antenna element array surface according to embodiments of the present invention. The filler material may be Teflon. RX and TX antenna pads may be placed on elevated portions of the array surface. RF ring shaped focusing elements may be placed on top of the filler material above respective antenna elements. The focusing elements may include studs.

Figure 6D:
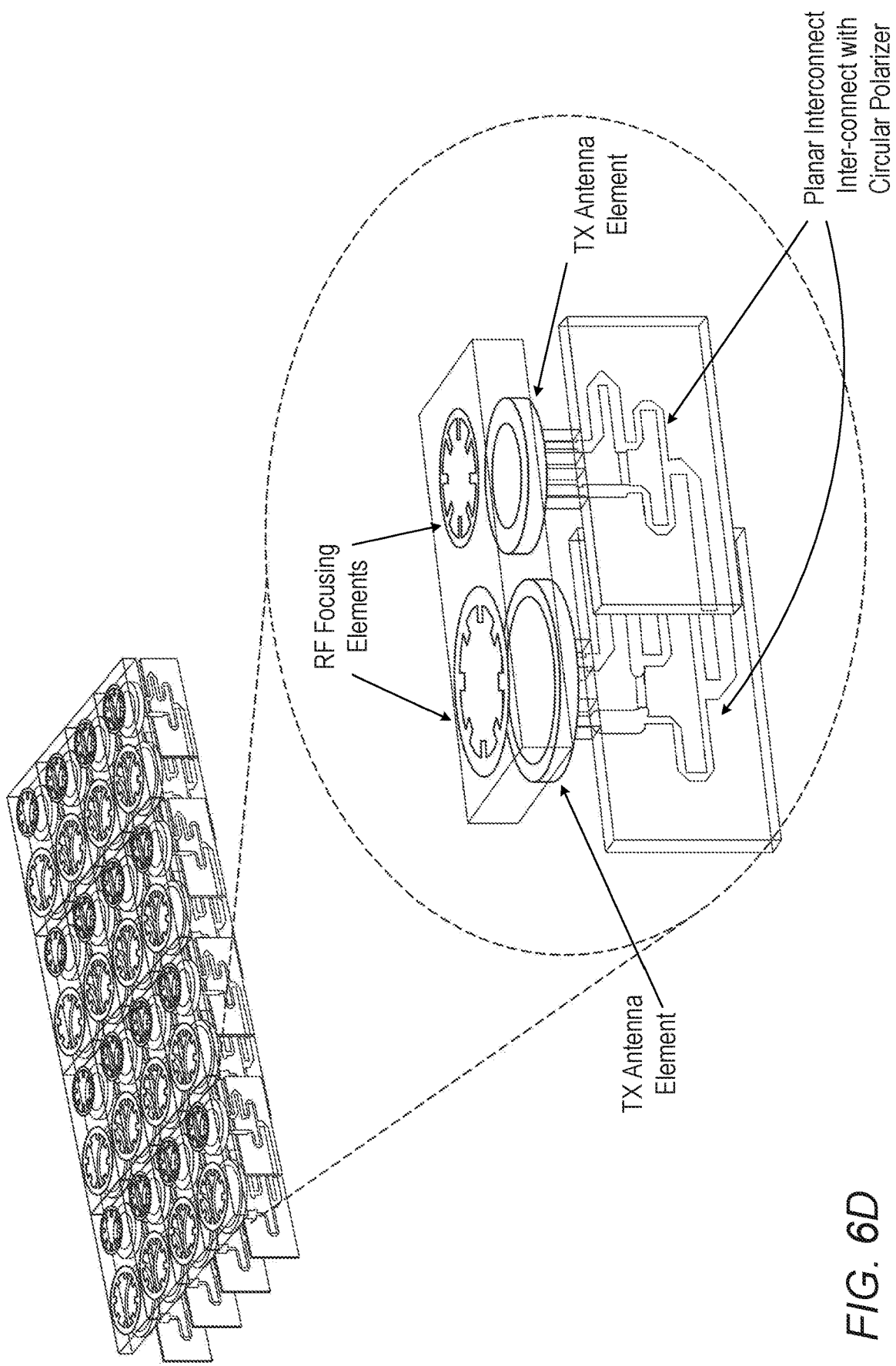
FIG. 6D is a prospective view, with PCB and filler material transparent, of the antenna element array surface illustrating the inter-planer interconnects which connect each cell to a respective intra-cluster signal line/waveguide PCB, wherein the interconnect includes a circular polarizer network.

FIG. 6D is a prospective view, with PCB and filler material transparent, of a cutaway the active antenna with antenna element array surface showing and the inter-planer interconnects, which connect each cell to a respective intra-cluster signal line/waveguide PCB, also showing. The illustrated interconnects include a circular polarizer network which connects to one point on the signal distribution and branches into two out of phase lines connecting to the antenna element.

Figure 7:
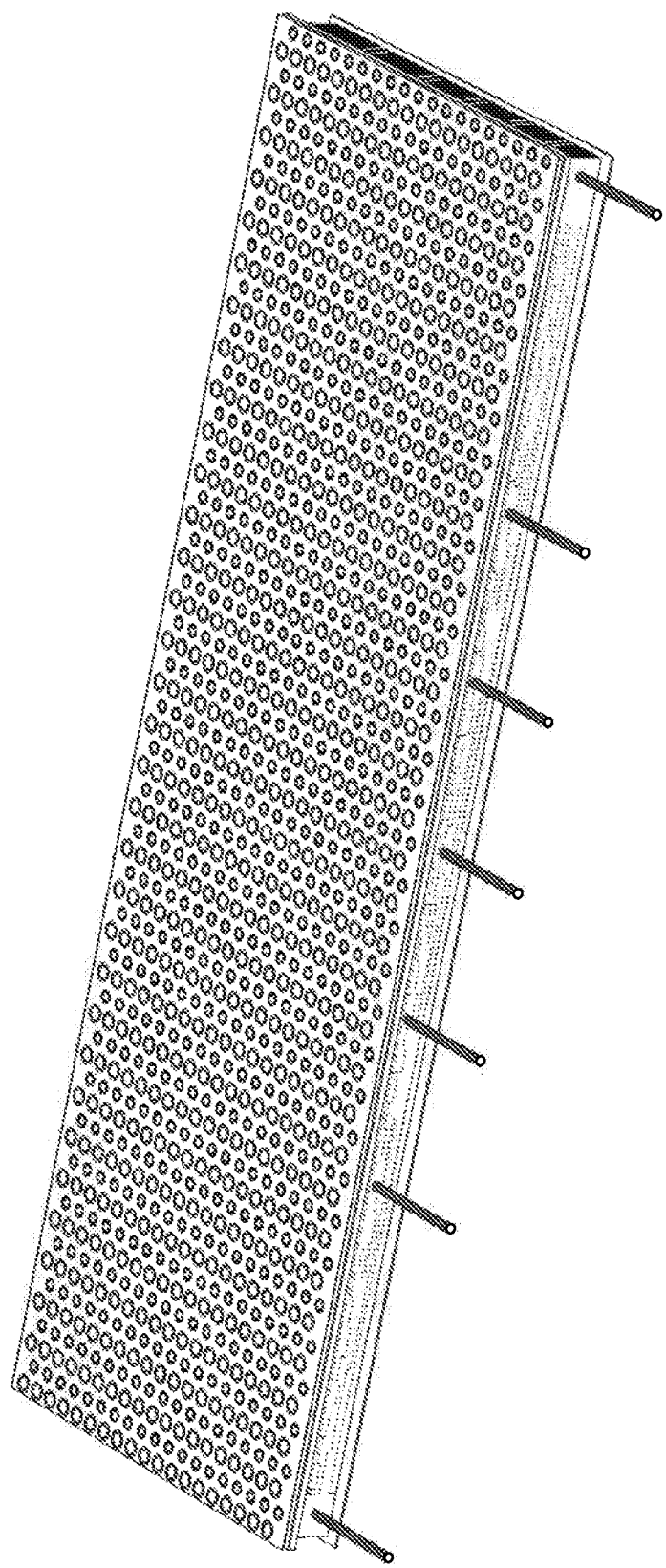
FIG. 7 shows a prospective view of a complete assembly of an exemplary beam steerable full duplex antenna according to embodiments of the present invention.

Turning now to FIG. 7, there is shown a prospective view of a complete assembly of an exemplary active beamforming, beam steerable, full-duplex, bi-directional antenna according to embodiments of the present invention.

The processes and displays presented herein are not inherently related to any particular computer, device, system or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Functions, operations, components and/or features described herein with reference to one or more embodiments, may be combined or otherwise utilized with one or more other functions, operations, components and/or features described herein with reference to one or more other embodiments, or vice versa. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A beam steerable integrated phase array antenna (WA) comprising:
   a first antenna element array comprising two or more antenna element clusters of a first cluster type and disposed on a first plane, wherein each cluster of the first cluster type is comprised of two or more radiating antenna elements electrically connected to one another with an intra-cluster signal distribution line, wherein said intra-cluster signal distribution line is connected to a signal source through an electrically controllable signal phase-shifter;
   a second antenna element array comprising at least one antenna element cluster of a second cluster type including two or more receiving antenna elements interconnected with an intra-cluster signal aggregation line and disposed between radiating antenna elements of said two or more clusters of the first cluster type, wherein said intra-cluster signal aggregation line is connected to signal drain through an electrically controllable signal phase-shifter; and wherein a transmission (TX) chain of said IPA includes a signal input port to receive a TX signal from a signal source, an inter-cluster signal distribution line to distribute the TX signal to each of a set of radiating antenna element clusters, an electrically controllable signal phase-shifter and a power amplifier between said inter-cluster signal distribution line and a respective intra-cluster signal distribution line of each of the radiating antenna element clusters.

2. The IPA according to claim 1, wherein said intra-cluster signal distribution line is substantially linear, disposed on a plane other than the first plane, and is connected to each of two or more antenna elements through a polarizer.

3. The IPA according to claim 2, wherein said radiating antenna elements are circular in shape and an antenna element cluster of the first type is arranged in a line.

4. The IPA according to claim 1, wherein said intra-cluster signal aggregation line is substantially linear, disposed on a plane different from a plane upon which said receiving antenna elements are disposed, and is connected to respective receiving antenna elements through a polarizer.

5. The IPA according to claim 4, wherein said receiving antenna elements are circular in shape and an antenna element cluster of the second type is disposed in a line.

6. The IPA according to claim 5, wherein said antenna clusters of the first type and antenna clusters of the second type are each linearly arranged and disposed side by side with one another in an alternating order.

7. The IPA according to claim 1, wherein a receive (RX) chain of said IPA includes a signal output port to provide an RX signal from to signal drain, an inter-cluster signal aggregation line to aggregate RX signals from each of a set of receiving antenna element clusters, an electrically controllable signal phase-shifter and a low-noise amplifier between said inter-cluster signal aggregation line and a respective intra-cluster signal aggregation line of each of the receiving antenna element clusters.

8. The IPA according to claim 7, wherein said radiating antenna element clusters and said receiving antenna element clusters are linear and disposed on a common plane next to one another in an interleaving order.

9. The IPA according to claim 7, further comprising a beam-steering controller configured to generate control signals for at least one of the phase-shifters on said TX chain.

10. The IPA according to claim 7, further comprising a beam-steering controller configured to generate control signals for at least one of the phase-shifters on said RX chain.

11. The IPA according to claim 7, further comprising a beam-steering controller configured to generate control signals for at least one of the phase-shifters on either the TX or RX chains and to generate a control signal for an electro-mechanical positioning actuator or motor of a platform on which said IPA is physically supported.

12. The IPA according to claim 1, wherein at least one radiating antenna element and or one at least one receiving antenna element is associated with a radio frequency focusing element disposed some distance above a radiating surface of said antenna element.

13. The IPA according to claim 12, wherein an antenna element, radiating or receiving, is circular and said radio frequency focusing element is ring shaped.

14. The IPA according to claim 13, wherein one or more of the antenna element clusters of the first type include: (a) two or more antenna elements configured for operation in the KA/K band; and (b) polarizers.

15. The IPA according to claim 14, wherein the polarizers are integrated and provide for circular polarization (LHCP/RHCP).

16. The IPA according to claim 13, wherein one or more of the antenna element clusters of the second type include: (a) two or more antenna elements configured for operation in the KA/K band; and (b) polarizers.

17. The IPA according to claim 16, wherein the polarizers are integrated and provide for circular polarization (LHCP/RHCP).

18. A wireless communication system comprising:
a wireless transceiver; and
integrated bidirectional phase array antenna (IPA) comprising:
a first antenna element array comprising two or more antenna element clusters of a first cluster type and disposed on a first plane, wherein each cluster of the first cluster type is comprised of two or more radiating antenna elements electrically connected to one another with an intra-cluster signal distribution line, wherein said intra-cluster signal distribution line is connected to a signal source through an electrically controllable signal phase-shifter;
a second antenna element array comprising at least one antenna element cluster of a second cluster type including two or more receiving antenna elements interconnected with an intra-cluster signal aggregation line and disposed between radiating antenna elements of said two or more clusters of the first cluster type, wherein said intra-cluster signal aggregation line is connected to signal drain through an electrically controllable signal phase-shifter; and
wherein a transmission (TX) chain of said IPA includes a signal input port to receive a TX signal from a signal source, an inter-cluster signal distribution line to distribute the TX signal to each of a set of radiating antenna element clusters, an electrically controllable signal phase-shifter and a power amplifier between said inter-cluster signal distribution line and a respective intra-cluster signal distribution line of each of the radiating antenna element clusters.

19. The system according to claim 18, wherein at least one radiating antenna element and or one at least one receiving antenna element is associated with a radio frequency focusing element disposed some distance above a radiating surface of said antenna element.

20. The system according to claim 19, wherein is an antenna element, radiating or receiving, is circular and said radio frequency focusing element is ring shaped.

* * * * *